H. RANDALL.

Improvement in Balance-Wheels.

No. 131,782.  Patented Oct. 1, 1872.

Witnesses.
C. H. Duell
A. V. Bentley

Inventor.
Hosea Randall
by Charles Foster
his Attorney

UNITED STATES PATENT OFFICE.

HOSEA RANDALL, OF SCOTT, NEW YORK.

IMPROVEMENT IN BALANCE-WHEELS.

Specification forming part of Letters Patent No. 131,782, dated October 1, 1872.

*To all whom it may concern:*

Be it known that I, HOSEA RANDALL, of the town of Scott, in the county of Cortland and State of New York, have invented certain Improvements in Balancers or Balance-Wheels, of which the following is a specification:

The nature and object of my invention are the adjusting of weights in machinery upon the spokes of wheels or revolving cylinders, so that such weights may be readily located nearer to or further from the center so as to increase or diminish the momentum of the wheel, and, at the same time, serve as a means of balancing the same.

Figure 1:
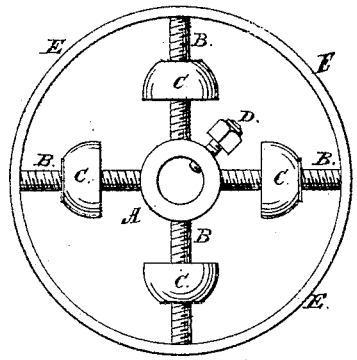
Figure 2:
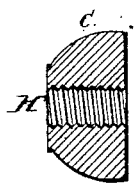

In the drawing, Figure 1 represents a side view or elevation of the wheel or an end view of a cylinder; and Fig. 2 is a vertical section through the center of one of the weights.

E is the rim of the wheel or cylinder, of any desired diameter. R is the hub or shaft of the wheel. These two parts are connected by four or more spokes, B B B B. Upon these spokes is cut a screw the entire length. Upon them are placed heavy weights c c, having a screw cut through their centers corresponding to the screw on the spokes. D is a screw, passing through one side of the hub, by which to fasten or tighten it upon the shaft. The weights are moved nearer to or further from the center by turning them on the screw-spokes. If all be moved out to the circumference the momentum of the wheel will be increased. If all are moved in toward the center the momentum will be decreased; and, at whatever distance from the center the weights may be, they are readily adjusted so as to perfectly balance the wheel.

What I claim, and desire to secure by Letters Patent, is—

The combination of the hub R, screw-spokes B B B B, the weights c c c c, and rim E, substantially as and for the purpose hereinbefore set forth.

In testimony whereof I have signed my name to this specification in the presence of two subscribing witnesses.

HOSEA RANDALL.

Witnesses:
    MORGAN L. WEBB,
    R. H. DUELL.